(12) United States Patent
Li

(10) Patent No.: US 10,625,141 B2
(45) Date of Patent: Apr. 21, 2020

(54) SELF-BALANCING VEHICLE

(71) Applicant: INMOTION SPORTS TECHNOLOGIES CO., LTD, Shenzhen (CN)

(72) Inventor: Yipeng Li, Shenzhen (CN)

(73) Assignee: Shenzhen Tomoloo Technology Industrial Co., LTD, Shenzhen, Guangdong (CN)

( * ) Notice: Subject to any disclaimer, the term of this patent is extended or adjusted under 35 U.S.C. 154(b) by 0 days.

(21) Appl. No.: 16/170,832

(22) Filed: Oct. 25, 2018

(65) Prior Publication Data
US 2019/0351315 A1    Nov. 21, 2019

(30) Foreign Application Priority Data

May 21, 2018  (CN) ..................... 2018 2 0763200 U

(51) Int. Cl.
| | |
|---|---|
| *A63C 17/12* | (2006.01) |
| *A63C 17/26* | (2006.01) |
| *A63C 17/08* | (2006.01) |

(52) U.S. Cl.
CPC .............. *A63C 17/12* (2013.01); *A63C 17/08* (2013.01); *A63C 17/26* (2013.01); *A63C 2203/12* (2013.01); *A63C 2203/22* (2013.01); *A63C 2203/24* (2013.01)

(58) Field of Classification Search
CPC ......... A63C 17/12; A63C 17/08; A63C 17/26; A63C 2203/12; A63C 2203/22; A63C 2203/24

USPC ......................................................... 180/181
See application file for complete search history.

(56) References Cited

U.S. PATENT DOCUMENTS

| | | | | |
|---|---|---|---|---|
| 8,672,074 | B2 * | 3/2014 | Ganeous ................ | A63C 17/10 180/181 |
| 8,684,121 | B2 * | 4/2014 | Treadway ............ | A63C 17/006 180/181 |
| 9,808,705 | B2 * | 11/2017 | Treadway .............. | A63C 17/12 |
| 2006/0049595 | A1 * | 3/2006 | Crigler ................... | A63C 17/01 280/87.042 |
| 2017/0233023 | A1 * | 8/2017 | Chen ...................... | B62K 25/00 280/63 |
| 2018/0015355 | A1 * | 1/2018 | Desberg ............. | A63C 17/0046 |
| 2018/0257732 | A1 * | 9/2018 | Chen .................... | B62K 11/007 |

* cited by examiner

*Primary Examiner* — John D Walters

(57) ABSTRACT

A self-balancing vehicle includes two vehicle bodies, respectively including a carrier assembly, a moving mechanism, a control assembly, and a power supply device coupled to the control assembly. The carrier assembly includes a frame and a foot platform coupled to the frame to form a cavity. The frame recess towards the foot platform defining a groove. The moving mechanism includes a wheel disposed on the groove side of the frame and a driving member. Part of the wheel is accommodated in the groove. The driving member drive the wheel to rotate relative to the frame. The control assembly includes a posture sensor detecting a tilt angle of the frame with respect to the vertical direction and a controller controlling a rotation speed of the driving member. At least one of the power supply device and the controller is accommodated in the cavity.

13 Claims, 12 Drawing Sheets

SELF-BALANCING VEHICLE

CROSS-REFERENCE TO RELATED APPLICATIONS

This application claims priority to Chinese Patent Application No. 2018207632006, entitled "SELF-BALANCING VEHICLE" filed May 21, 2018, the contents of which is expressly incorporated herein by reference in its entirety.

TECHNICAL FIELD

The present disclosure relates to self-balancing technologies, and more particularly relates to a self-balancing vehicle.

BACKGROUND

With the rapid development of the balancing vehicle technology and the continuously improvement of people's living standards, more and more users choose self-balancing vehicles as a means of travel. When driving a self-balancing vehicle, the user can achieve acceleration, deceleration, turning, etc. by changing the gravity center thereof, which makes the self-balancing vehicle easy to operate and easy to use. However, a conventional self-balancing vehicle is mostly heavy and bulky, which is not easy to carry.

SUMMARY

According to various embodiments of the present disclosure, a self-balancing vehicle is provided.

A self-balancing vehicle includes two spaced apart vehicle bodies. Each vehicle body includes a carrier assembly, a moving mechanism, a control assembly, and a power supply device. The carrier assembly includes a frame and a foot platform. The foot platform is connected to the frame to cooperatively form a cavity. A side of the frame away from the foot platform defines a groove. The moving mechanism includes a wheel and a driving member. The wheel is partially accommodated in the groove. The driving member is connected to the wheel and configured to driving the wheel to rotate relative to the frame. The control assembly includes a posture sensor and a controller. The posture sensor is configured to detect a tilt angle of the frame with respect to a vertical direction. The controller is electrically coupled to the driving member and configured to control a rotation speed of the driving member according to a detection result of the posture sensor. The power supply device is electrically coupled to the control assembly. At least one of the power supply device and the controller is accommodated in the cavity.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the objects, technical solutions and advantages of the present application more clear, the present application will be further described in detail below with reference to the accompanying drawings and embodiments. It should be understood that the specific embodiments described herein are merely illustrative and are not intended to be limiting the present application.

It should be noted that when an element is referred to as being "fixed" or connected to another element, it can be directly fixed on or connected to the other element or the element can be indirectly fixed on or connected to the other element via one or more intermediate elements. Rather, when an element is referred to as being "directly fixed on" or "directly connected to" another element, then there is no intermediate element. The terms "vertical," "horizontal," "left," "right," and the like, as used herein, are for illustrative purposes only.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
FIG. 1 is a schematic view illustrating a self-balancing vehicle in accordance with a first embodiment in a using status.

Referring to FIG. 1, the self-balancing vehicle according to a first embodiment includes two spaced apart vehicle bodies 10. The two vehicle bodies 10 are in one-to-one correspondence with two feet of a user. In the present embodiment, the two vehicle bodies 10 have substantially the same structures. The structure of the vehicle body 10 will be described in detail below by taking one of the vehicle bodies 10 as an example.

Figure 2:
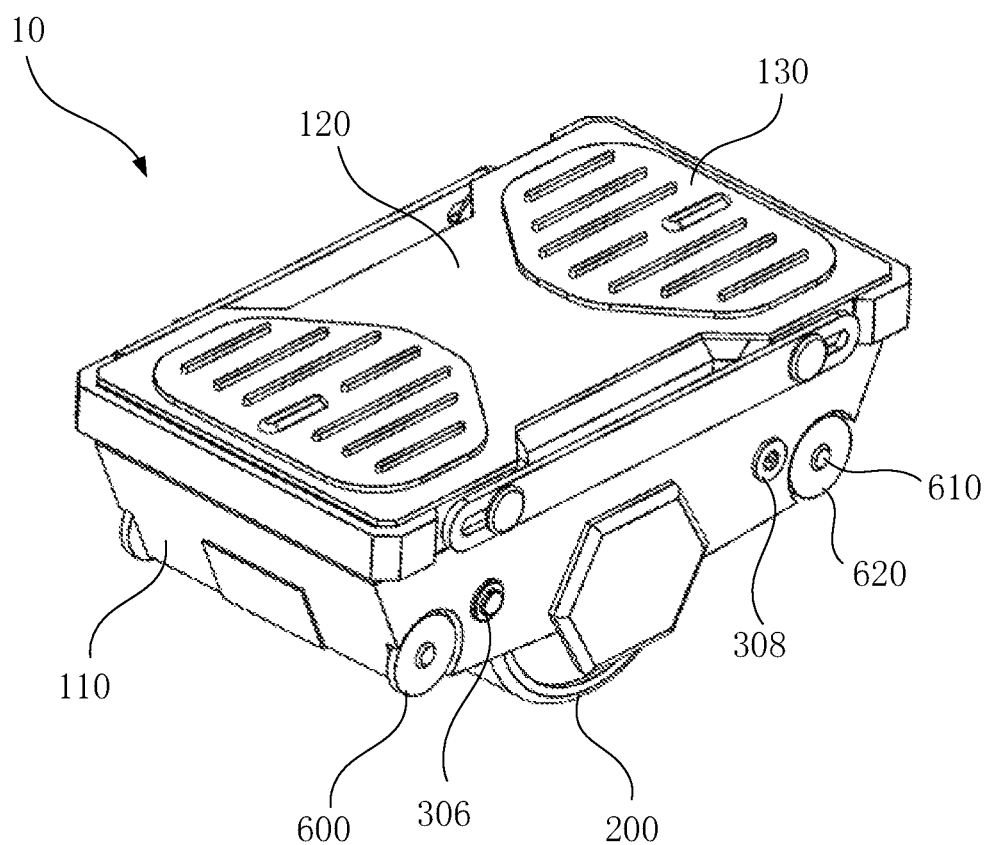
FIG. 2 is a perspective view of a vehicle body of the self-balancing vehicle of FIG. 1.
Figure 3:
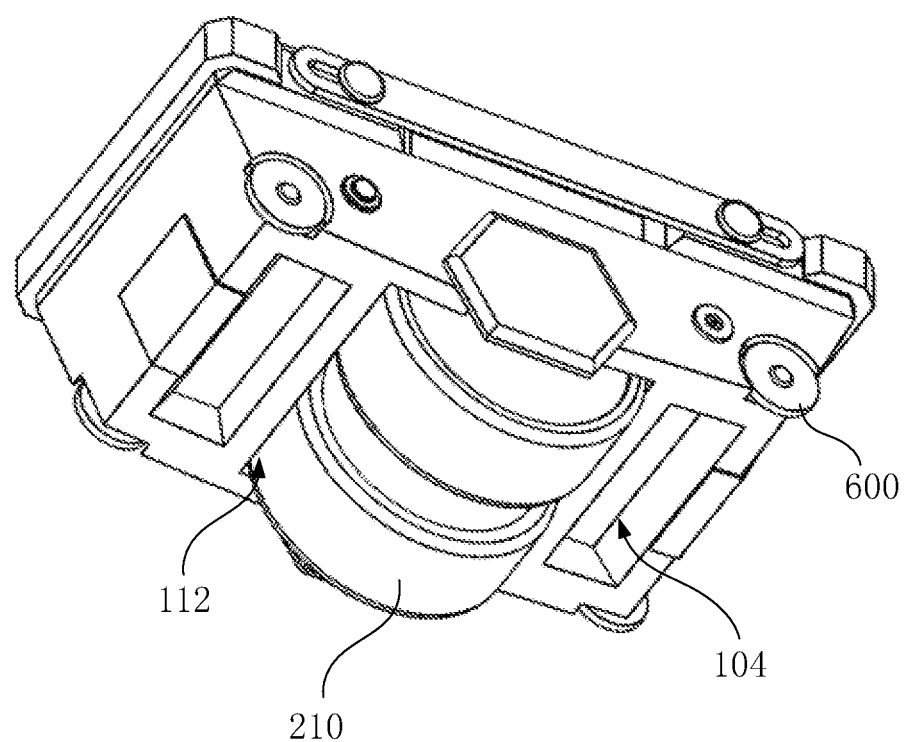
FIG. 3 is a perspective view of the vehicle body of FIG. 2 viewed from another aspect.
Figure 4:
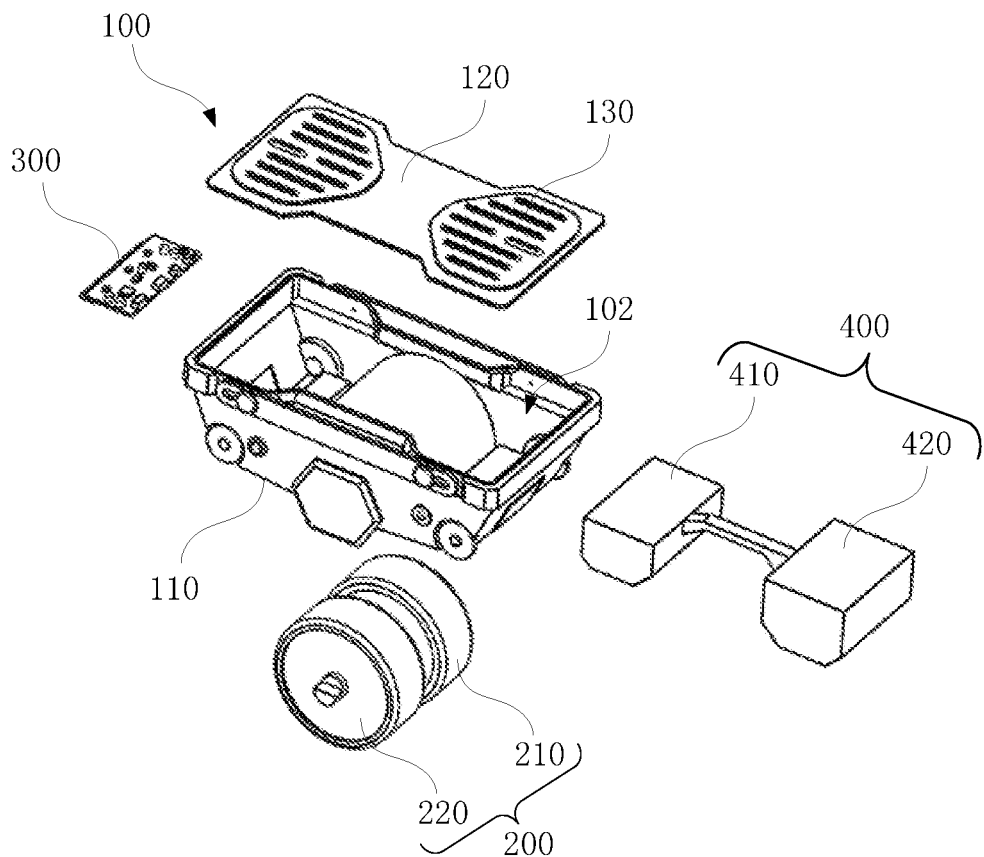
FIG. 4 is an perspective, exploded view of the vehicle body of FIG. 2.

Referring to FIGS. 2 to 4, the vehicle body 10 includes a carrier assembly 100, a moving mechanism 200, a control assembly 300, and a power supply device 400. As a main support structure; the carrier assembly 100 is used to support the moving mechanism 200, the control assembly 300, and the power supply device 400. The control assembly 300 can control the status of the moving mechanism 200 according to the status of the carrier assembly 100, thereby achieving self-balancing of the vehicle body 10. The power supply device 400 is used to provide power to the control assembly 300.

In one embodiment, the carrier assembly 100 includes a frame 110 and a foot platform 120 connected by a snap-fit structure. The frame 110 has a hollow structure. The foot platform 120 is located on top of the frame 110, so as to cooperatively define a cavity 102 therebetween.

The moving mechanism 200 includes a wheel 210 and a driving member 220. The wheel 210 is disposed on a side of the frame 110 away from the foot platform 120 and is located between the foot platform 120 and the ground. The driving member 220 is connected to the wheel 210 and can drive the wheel 210 to rotate relative to the frame 110.

Figure 5:
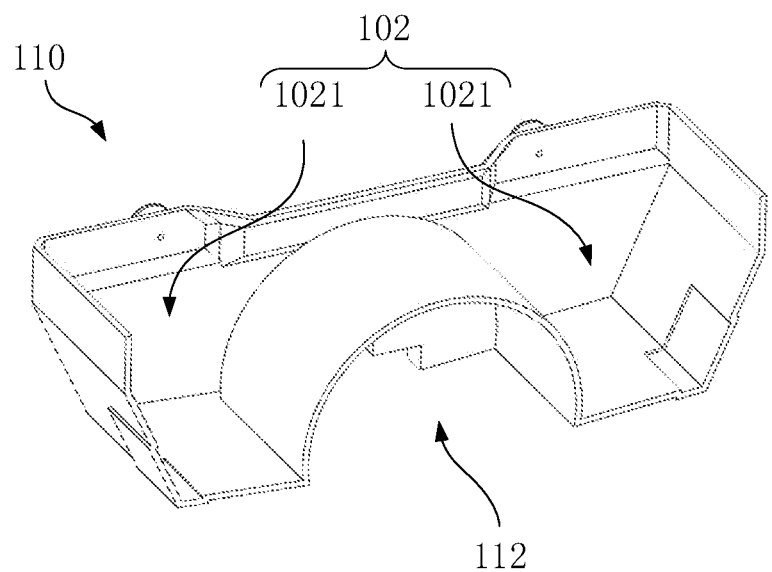
FIG. 5 is a perspective, cut-away view of a frame of the vehicle body of FIG. 4.

Further referring to FIG. 5, in the illustrated embodiment, the bottom of the frame 110 defines a groove 112 recessed towards the foot platform 120. Therefore, a longitudinal section of the frame 110 in the front-rear direction is substantially W-shaped. The cavity 102 is divided into two chambers 1021 that communicate with each other. The two chambers 1021 are separated by a protrusion structure surrounding the groove 112. The two chambers 1021 are respectively located at opposite sides of an axis of the wheel 210. Part of the wheel 210 is received within the groove 112 to reduce a distance between the wheel 210 and the foot platform 120. This can reduce an overall height of the vehicle body 10, thereby increasing the stability of the vehicle body 10. In one embodiment, the lowest point of inner walls of the two chambers is lower than the highest point of the wheel 210.

In an alternative embodiment, the carrier assembly 100 includes a main frame and a housing. The main frame is made of a metal material, and is used to support the moving mechanism 200, the control assembly 300, power supply device 400, etc. The housing is disposed on an outer side of the main frame, and serves as a protection and decoration. The housing can be an integrally formed structure that is mounted on the main frame from bottom to top. The housing can also include a plurality of parts, such as an upper structure and a lower structure respectively mounted on upper and lower sides of the main frame, or a front structure and a rear structure respectively mounted on the front and rear sides of the main frame, or a front structure and a rear structure respectively mounted on the front and rear sides of the moving mechanism 200, etc.

Referring to FIG. 3, two handle slots 104 are defined on the bottom side of the frame 110 to facilitate the user to lift up the vehicle body 10.

The foot platform 120 is used for the user to step on by one foot. An area on the foot platform 120 that the user stands matches the size of one foot of the user. An orthographic projection of a geometric center of the foot platform 120 on the ground coincides with an orthographic projection of a geometric center of the wheel 210 on the ground, thereby improving stability of the vehicle body 10 during operation.

Figure 7:
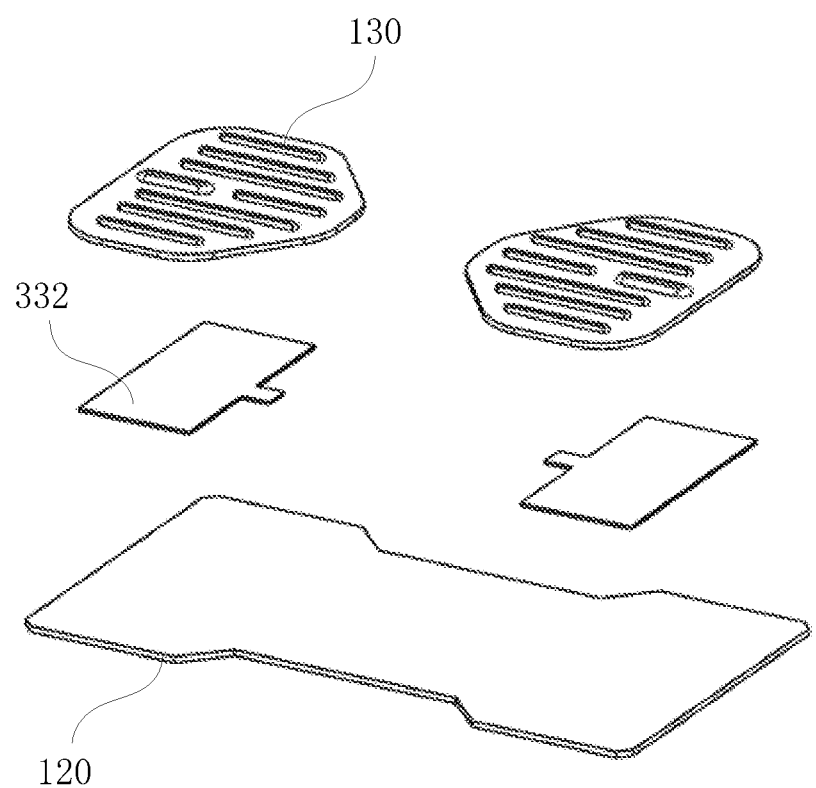
FIG. 7 is an exploded view showing an anti-slip pad and a foot platform of the vehicle body of FIG.

Referring to FIG. 7, the carrier assembly 100 further includes an anti-slip pad 130. The anti-slip pad 130 is disposed on a top side of the foot platform 120 away from the wheel 120. In one embodiment, the anti-slip pad 130 is made of sandpaper, rubber, silicone, etc. The anti-slip pad 130 can increase the friction between the user's feet and the foot platform 120, so that the user can complete a steering motion with the leg as the axis, or a tilting motion such as forward tilting and backward tilting. The anti-slip pad 130 can be a continuous unitary structure, or be divided into a plurality of pieces and arranged on the foot platform 120 at intervals. It should be understood that in other embodiment the anti-slip pad 130 can also be omitted.

Figure 13:
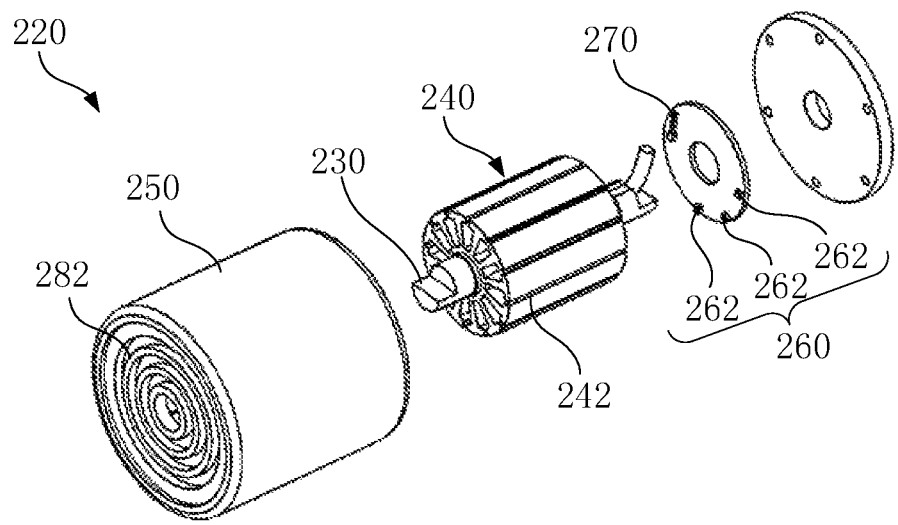
FIG. 13 is a perspective, exploded view of the moving mechanism shown in accordance with an embodiment.

In the present embodiment, the number of the wheel 210 and the driving member 220 are both one. The driving member 220 is integrated into a hub of the wheel 210. Referring to FIG. 13, the driving member 220 is a three-phase winding brushless motor. The driving member 220 includes a central shaft 230, a stator 240, a rotor 250, and a Hall sensor 260. The central shaft 230, the stator 240, and the rotor 250 are coaxially arranged. The wheel 210 is fixed to the rotor 250. The rotor 250 can drive the wheel 210 to rotate relative to the stator 240. The Hall sensor 260 is coupled to the central shaft 230, and is used to detect a position of the rotor 250 when the rotation direction of the rotor 250 changes. The control assembly 300 can drive the rotor 250 to rotate continuously according to a detection result of the Hall sensor 260. In an alternative embodiment, the driving member 220 can also be coupled to the wheel 210 via a transmission means, such as a gear.

Figure 11:
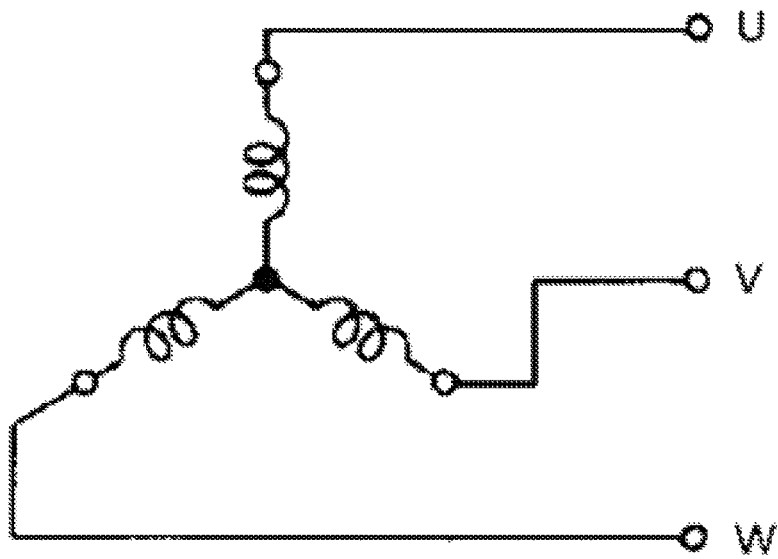
FIG. 11 is a circuit diagram illustrating an electrical winding of a driving member shown in FIG. 8.
Figure 12:
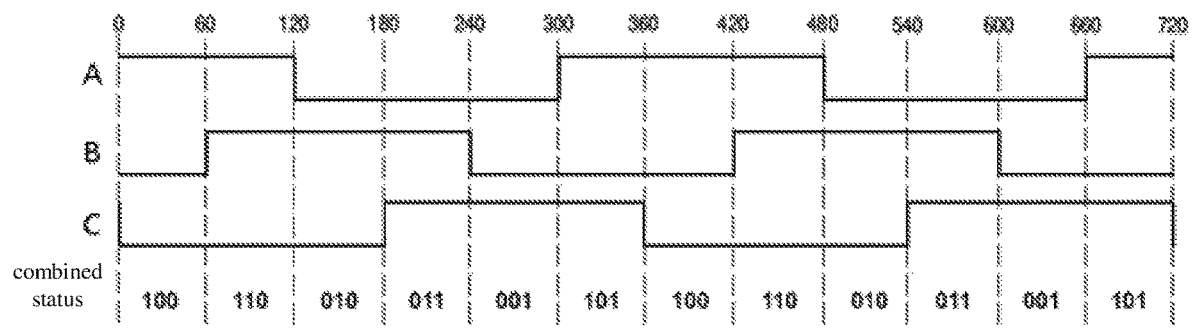
FIG. 12 is a Hall commutation waveform diagram of the driving member shown in FIG. 8.

In the illustrated embodiment, the rotor 250 is located at an outer side of the stator 240. The stator 240 includes a stator core 242 and a stator winding. The stator winding is disposed on the stator core 242. The copper wires of the stator winding is used to generate magnetic force to drive the rotor 250 and draw three phase-connected phase lines. Further referring to FIG. 11, the three-phase lines are U-phase line, V-phase line and W-phase line. The Hall sensor 260 includes three Hall chips 262 corresponding to the three phase lines respectively. Further referring to FIG. 12, signals detected by the three Hall chips 262 are respectively signal A, signal B, and signal C. Each signal is represented by a binary number of 0 or 1. Under normal circumstances, combination results "000" and "111" would not occur. Therefore, there are a total of six combination results of the signal A, the signal B, and the signal C. Each combination result corresponds to a physical position of the rotor 250. After the Hall sensor 260 transmits the physical position information of the rotor 250 to the control assembly 300, the control assembly 300 can change a current direction in the stator winding to continuously rotate the rotor 250.

Since the driving member 220 may generate a large amount of heat during the operation, in order to prevent the driving member 220 from overheating which can affect the normal operation thereof, the driving member 220 further includes a temperature sensor 270. The temperature sensor 270 can detect the temperature of the stator winding. When the temperature is too high, the control assembly 300 stops the driving member 220 in time or causes the vehicle body 10 to generate an alarm to alert the user.

Figure 8:
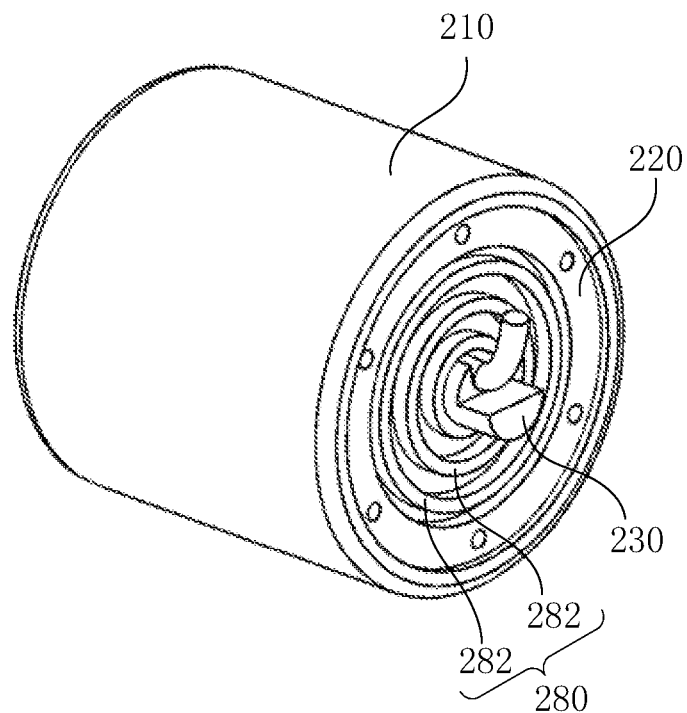
FIG. 8 is a perspective view of a moving mechanism of FIG. 2.

In order to ensure the normal operation of the driving member 220 and extend the service life of the driving member 220, a heat dissipation means can be employed. For example, as shown in FIG. 8, the moving mechanism 200 further includes a heat dissipating assembly 280. The heat dissipating assembly 280 includes a plurality of annular fins 282. The fins 282 are interval arranged at an end of the driving member 220 along a radial direction of the rotor 250.

Figure 9:
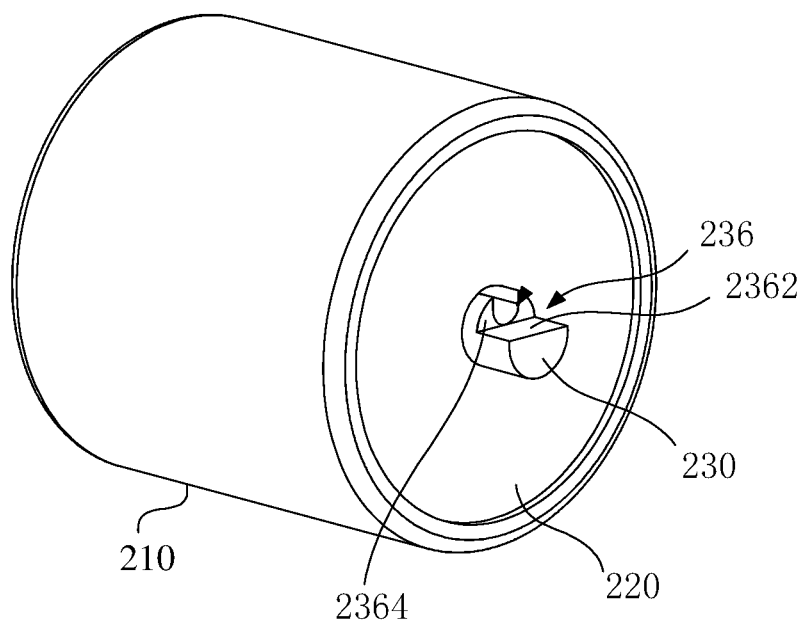
FIG. 9 is a perspective view of the moving mechanism of FIG. 8 when a heat dissipating assembly and a motor wire are omitted.
Figure 10:
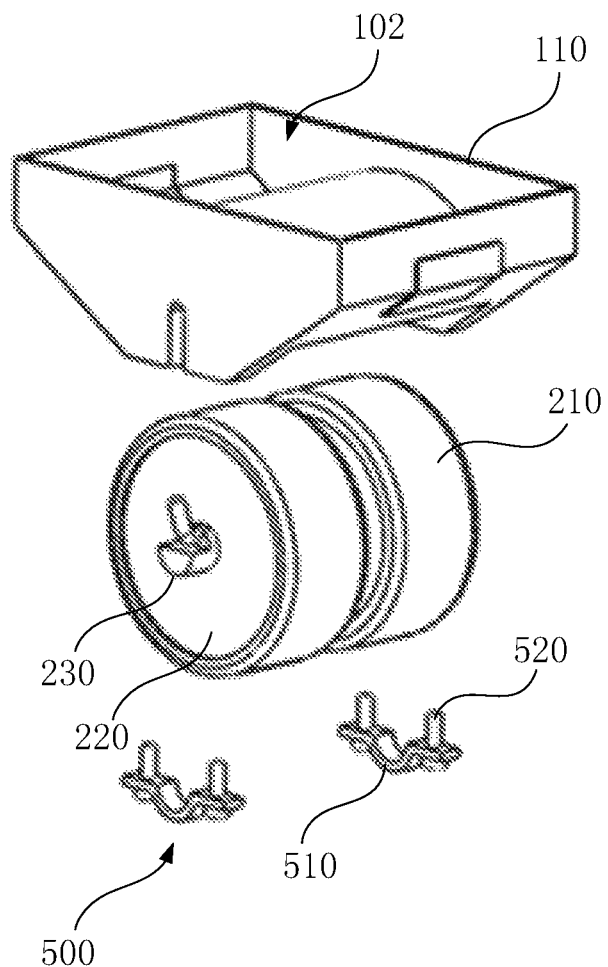
FIG. 10 is a partial exploded view of a frame, a moving mechanism, and a fixing assembly of FIG. 2.

Referring to FIGS. 8 to 10, an end face of the central shaft 230 is substantially D-shaped. In the illustrated embodiment, the central shaft 230 is further provided with a mounting groove 236. A central axis of the central shaft 230 is within a bottom surface 2362 of the mounting groove 236. The bottom surface 2362 is used to carry loads and transmit torque. When the moving mechanism 200 is fixed on the frame 110, the bottom surface 2362 abuts against the frame 110. That is, the bottom surface 2362 abuts against the bottom of the frame 110. A side surface 2364 of the mounting groove 236 is located between two ends of the central shaft 230. The bottom surface 2362 connects the side surface 2364 and one end surface of the central shaft 230.

In this embodiment, a width of the bottom surface 2362 in the radial direction of the central shaft 230 is equal to the diameter of the central shaft 230. That is, the axis of the central shaft 230 is located within the bottom surface 2362 of the mounting groove 236. In this way, the bottom surface 2362 has the largest width, which can increase the bearing size of the central shaft 230 and reduce the stress suffered by the central shaft 230. In an alternative embodiment, the bottom surface 2362 can be parallel to the axis of the central shaft 230. In this way, the width of the bottom surface 2362 in the radial direction of the central shaft 230 is less than the diameter of the central shaft 230.

In this embodiment, the vehicle body 10 further includes a fixing assembly 500. The fixing assembly 500 fastens the driving member 220 mainly by fastening a central shaft 230. In the illustrated embodiment, the fixing assembly 500 includes a fastening member 510 and a connecting member 520. The fastening member 510 is connected to the frame 110 via the connecting member 520. The central shaft 230 is clamped between the fastening member 510 and the frame 110. In the present embodiment, the number of the fixing assembly 500 is two. Both ends of the central shaft 230 are fixed to the frame 110 via the two fixing assemblies 500, respectively. At this point, an orthographic projection of the wheel 210 on the ground are entirely within an orthographic projection of the foot platform 120 on the ground. In an alternative embodiment, the driving member 220 can be fastened to the frame 110 by fastening one end of the central shaft 230. That is, only one set of fixing assembly 500 is needed.

In this embodiment, the contact width between the wheel 210 and the ground is greater than or equal to the diameter of the wheel 210. In one embodiment, the ratio between the contact width between the wheel 210 and the ground and the diameter of the wheel 210 is 1/2.

Figure 6:
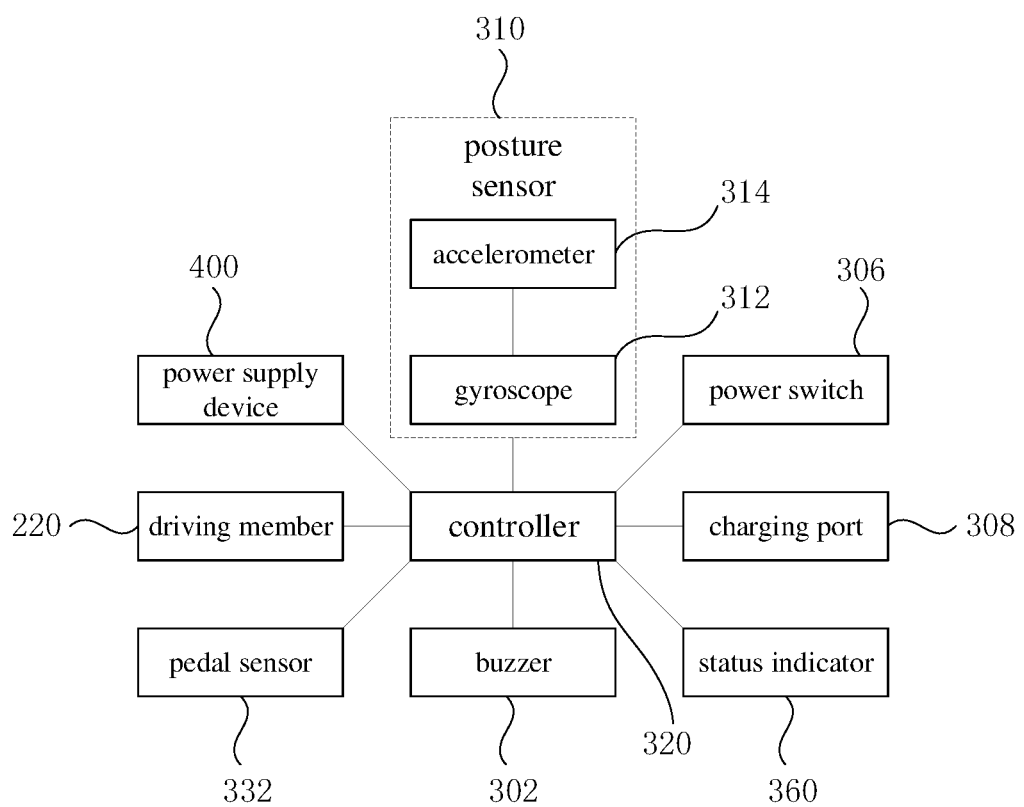
FIG. 6 is a block diagram of the vehicle body of FIG. 2.

Referring to FIG. 4 and FIG. 6, the control assembly 300 includes a posture sensor 310 and a controller 320. The posture sensor 310 can detect a tilt angle of the frame 110. The controller 320 is connected to the driving member 220, and can control the rotation speed of the driving member 220 according to the detection result of the posture sensor 310. In one embodiment, the posture sensor 310 includes a gyroscope 312 and an accelerometer 314. The posture sensor 310 can obtain an angle of the frame 110 with respect to gravity (that is, a posture angle of the frame 110) in real time in a dynamic and static status. The controller 320 enables the driving member 220 to exhibit a motion status corresponding to the posture angle of the frame 110.

For example, when the user drives the frame 110 to tilt forward, the posture sensor 310 can detect the forward tilt angle of the frame 110, and the controller 320 can control the driving member 220 to rotate forward according to the forward tilt angle, so that the vehicle body 10 can complete the forward motion. The greater the forward tilt angle, the greater the rotation speed of the driving member 220, and the greater the forward speed of the vehicle body 10. When the user drives the frame 110 to tilt backward, the driving member 220 rotates in a reverse direction to cause the vehicle body 10 to move backwardly. The greater the backward tilt angle, the greater the backward speed of the vehicle body 10.

In the present embodiment, the posture sensor 310 and the controller 320 are integrated on a single circuit board, and the circuit board is accommodated in the cavity 102. It should be understood that in an alternative embodiment, the posture sensor 310 and the controller 320 can be disposed separately, e.g., the posture sensor 310 can be disposed at other positions of the frame 110, and the controller 320 can be disposed on the moving mechanism 200.

Further referring to FIG. 7, the control assembly 300 further includes a pedal sensor 332. The pedal sensor 332 is disposed on the foot platform 120. In the illustrated embodiment, the pedal sensor 332 is located between the foot platform 120 and the anti-slip pad 130. The pedal sensor 332 is used to determine whether the vehicle body 10 carries a person and detect the weight of the load. The pedal sensor 332 can be a photoelectric switch, a pressure sensor, a membrane switch, or a mechanical collision switch. In order to improve an accuracy of the detection, two pedal sensors 332 are provided. The two pedal sensors 332 are respectively disposed at positions corresponding to the toes and the heels on the foot platform 120. In an alternative embodiment, only one pedal sensor 332 is provided, and the pedal sensor 332 is disposed at a central position of the foot platform 120.

Figure 14:
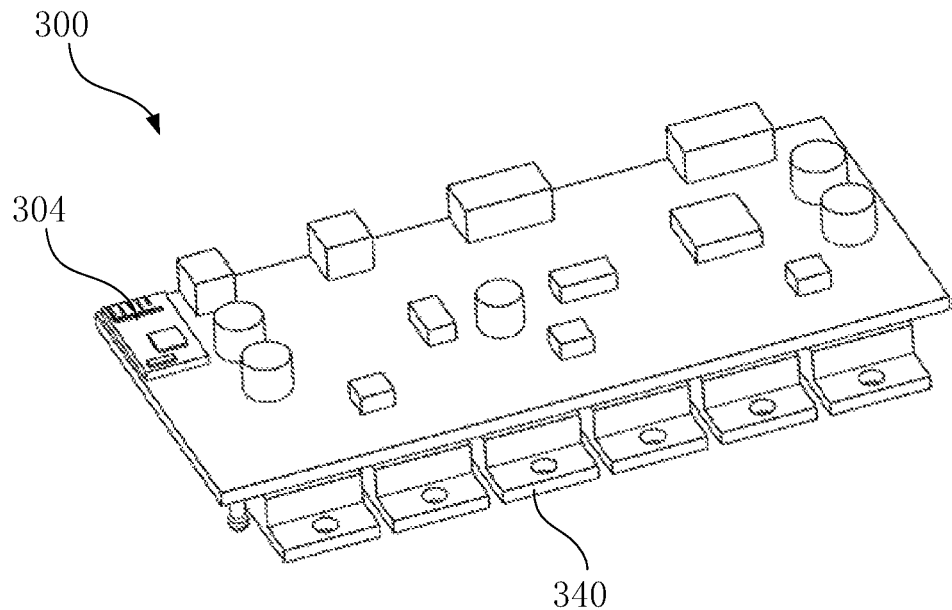
FIG. 14 is a perspective view of a control assembly shown in FIG. 4.

Referring to FIGS. 4, 6, and 14, the control assembly 300 further includes a power transistor 340. The power transistor 340 is mounted on the controller 320 and can drive the three phase lines of the driving member 220. Since a large current flows through the power transistor 340, a large amount of heat is generated, therefore the power transistor 340 is required to be subjected to a heat dissipation processing.

In the present embodiment, the power transistor 340 is accommodated in the cavity 102 and contacts the frame 110. That is, the power transistor 340 contacts the inner wall of the cavity 102. Thus, the heat generated by the power transistor 340 can be conducted to the frame 110 and dissipated to the outside. It should be understood that in an alternative embodiment, the power transistor 340 can conduct heat to the frame 110 indirectly through at least one intermediate structure that has a heat conduction function.

In this embodiment, the control assembly 300 further includes a buzzer 302, a communication module 304, a power switch 306, and a charging port 308. The buzzer 302 is electrically coupled to the controller 320 and is capable of making an audible indication. The communication module 304 is accommodated in the cavity 102, and is integrated on a circuit board with the controller 320. The two vehicle bodies 10 can be wirelessly communicated through the communication module 304 to synchronize the status of the two vehicle bodies 10. For example, when one vehicle body 10 is alerted due to overspeed, the other vehicle body 10 will alert at the same time. The communication module 304 can be communicated with a mobile terminal for human-computer interaction.

The power switch 306 is positioned on the frame 110 and is electrically coupled to the controller 320 to activate or deactivate the vehicle body 10. The charging port 308 is disposed on the frame 110 and is electrically coupled to the power supply device 400. The charging port 308 can be connected to an external power supply to charge the power supply device 400.

The power supply device 400 is detachably connected to the frame 110. In this embodiment, the power supply device 400 is accommodated in the cavity 102 and is electrically coupled to the control assembly 300. The power supply device 400 fully utilizes an internal space of the carrier assembly 100, so that a structural layout of the vehicle body 10 is more reasonable, and the volume of the vehicle body 10 is reduced as well. It should be understood that in an alternative embodiment, one of the controller 320 and the power supply device 400 is accommodated in the cavity 102, and the other one is located at outside of the cavity 102.

Referring to FIG. 4, in one embodiment, to accommodate the shape of the frame 110, the power supply device 400 includes two batteries 410, 420 electrically coupled to each other. The two batteries 410, 420 are received in the cavity 102 and are respectively located at opposite sides of the protrusion structure surrounding the groove 112. In one embodiment, the two batteries 410, 420 are respectively received in the two chambers 1021. This can not only reduce the overall height of the vehicle body 10 to improve stability and safety, but also reasonably balance the weight of each part of the vehicle body 10 to ensure that the gravity center of the vehicle body 10 is substantially directly above the axis of the wheel 210.

Figure 15:
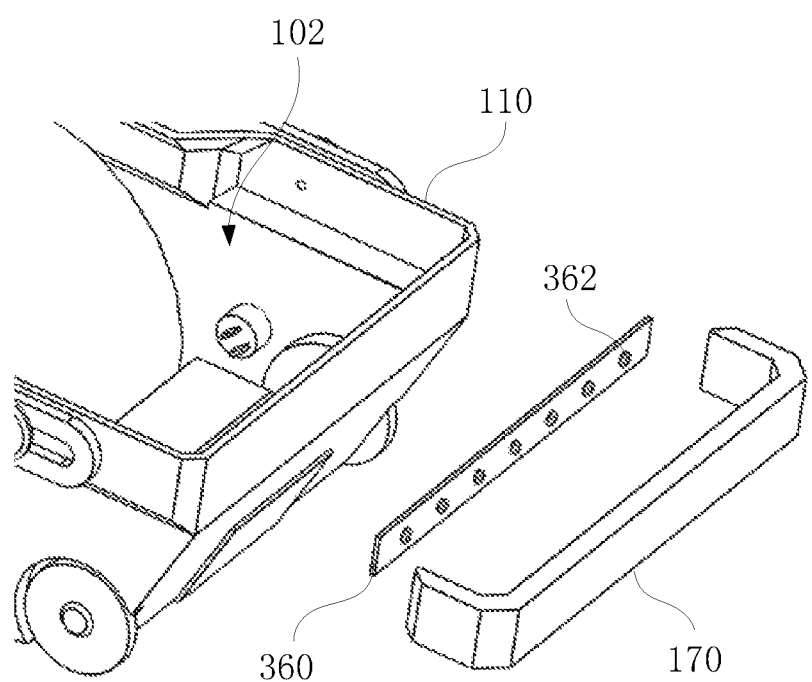
FIG. 15 is a partial, exploded view showing a frame, a status indicator, and an bumper strip of FIG. 2.

In this embodiment, referring to FIG. 15, the vehicle body 10 further includes a status indicator 360. The status indicator 360 is disposed at least one of the front side and the rear side of the carrier assembly 100. The status indicator 360 can be used to indicate the operating status of the vehicle body 10, for example emitting a light of a certain color when advancing, and emitting a light of another color when reversing. The status indicator 360 can be further used to indicate power status of the power supply device 400, such as emitting a light of a certain color when the power is sufficient, and emitting a light of another color when the power is insufficient to remind the user to charge the power supply device 400 in time.

In one embodiment, the status indicator 360 can include a lamp bead 362 and a protective cover (not shown) to protect the light bead 362. The number of the lamp bead 362 can be multiple. The brightness and color of the light emitted by each lamp bead 362 can be the same, or different for decoration. In addition, the power amount of the power supply device 400 can be indicated by controlling the number of illuminated lamp bead 362. In addition to protecting the lamp bead 362, the protective cover further has a uniform light effect. In one embodiment, the protective cover is made of dark translucent soft material. When the lamp bead 362 is powered off, the protective cover can hide the lamp bead 362, so that people cannot see an internal structure therein from the outside, thereby improving the appearance thereof. When the lamp bead 362 is turned on, the protective cover will not affect the lighting effect of the lamp bead 362.

In addition, the carrier assembly 100 further includes a plurality of bumper strips 170. The plurality of bumper strips 170 are respectively disposed around the frame 110. The bumper strip 170 is made of a material having a certain elasticity such as rubber, etc. which can cushion an impact force when colliding with other objects and protect the frame 110. The multiple bumper strips 170 can be integrally formed and connected to each other end to end, or can be disposed on the outer surface of the frame 110 spaced apart from each other.

In the illustrated embodiment, the bumper strip 170 is made of a translucent material, and the status indicator 360 is disposed between the bumper strip 170 and the frame 110.

It can be understood that in an alternative embodiment, the protective cover can be omitted. The bumper strip 170 can protect the lamp bead 362. Alternatively, the status indicator 360 can be placed at the remaining positions of the frame 110, such as at both ends of the wheel 210, etc.

Referring to FIG. 2, in this embodiment, the vehicle body 10 further includes at least two auxiliary support mechanisms 600. The auxiliary support mechanisms 600 are connected to the frame 110 respectively from a front side and a rear side of the frame 110, and are used to contact the ground when the frame 110 tilts forward or backward, thereby reducing wear of the frame 110.

In this embodiment, the auxiliary support mechanism 600 includes a rotating shaft 610 and a roller 620. The roller 620 is rotatably connected to the frame 110 through the rotating shaft 610. The axis of the roller 620 is parallel to the axis of the wheel 210. In one embodiment, the number of the roller 620 can be four. The four rollers 620 are respectively disposed at four corners of the frame 110. In an alternative embodiment, the roller 620 can be fixedly coupled to the frame 110, or two rollers 620 disposed coaxially can be integrated into a single cylinder.

Figure 16:
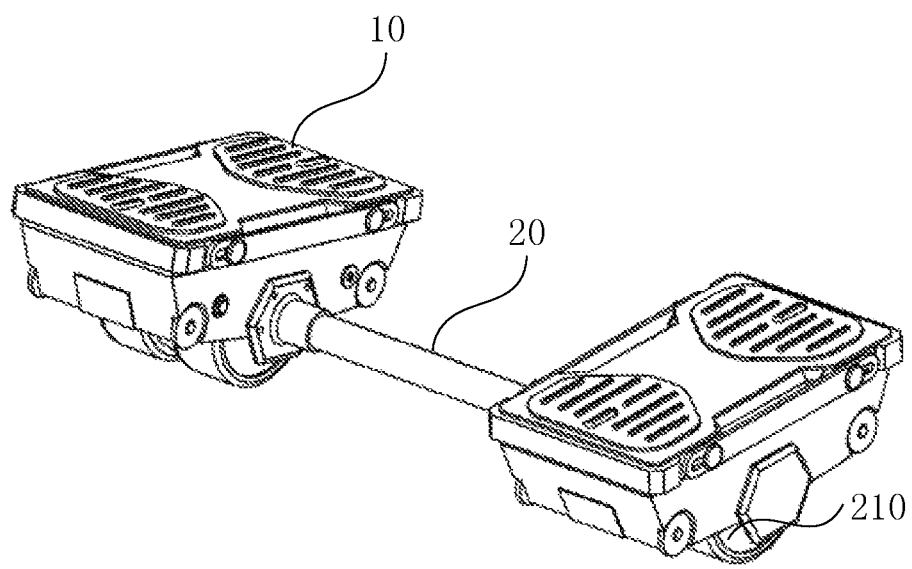
FIG. 16 is a schematic view of a self-balancing vehicle in accordance with a second embodiment.

In an alternative embodiment, referring to FIG. 16, the self-balancing vehicle can includes include two vehicle bodies 10 connected with each other via a connecting rod 20. In one embodiment, the two vehicle bodies 10 are detachably rotatably coupled to both ends of the connecting rod 20, respectively. The axial direction of the connecting rod 20 is consistent with the axial direction of the wheel 210. The two vehicle bodies 10 are rotatably connected at both ends of the connecting rod 20 respectively. This enables the vehicle bodies 10 to rotate synchronously or relatively, and disenables the vehicle bodies 10 to change the left-right distance or the front-rear distance therebetween. The axis of the connecting rod 20 can coincide with the axis of the wheel 210 or be parallel to the axis of the wheel 210.

For the self-balancing vehicle with two vehicle bodies 10, the self-balancing vehicle performs a forward or backward operation when the speeds of the two vehicle bodies 10 are the same. When the speeds of the two vehicle bodies 10 are inconsistent, the self-balancing vehicle performs a turning operation. When the steering of the two vehicle bodies 10 is reversed, the self-balancing vehicle can perform an in-place turning operation. When the foot platforms 120 of the two vehicle bodies 10 are horizontal and the speed is zero, the self-balancing vehicle can be substantially hovered and balanced in-place.

When the user's feet press forward the foot platforms 120, the two vehicle bodies 10 accelerate forward. The user can press backward the foot platforms 120 to control the vehicle bodies 10 to decelerate. The deceleration process utilizes the principle of electronic braking, that is, the driving member 220 can generate a suitable braking force by means of software control to recover kinetic energy into electrical energy, thereby charging the power supply device 400.

The technical features of the above embodiments can be arbitrarily combined. For the sake of brevity of description, all possible combinations of the technical features in the above embodiments are not described. However, as long as there is no collision in the combination of these technical features, it should be considered as the scope described in this specification.

The foregoing implementations are merely specific embodiments of the present disclosure, and are not intended to limit the protection scope of the present disclosure. It should be noted that any variation or replacement readily figured out by, persons skilled in the art within the technical scope disclosed in the present disclosure shall all fall into the protection scope of the present disclosure. Therefore, the protection scope of the present disclosure shall be subject to the protection scope of the claims.

What is claimed is:

1. A self-balancing vehicle, comprising:
   two spaced apart vehicle bodies, each vehicle, body comprising:
      a carrier assembly comprising a frame and a foot platform, wherein the foot platform is connected to the frame to cooperatively form a cavity, a side of the frame away from the foot platform defines a groove;
      a moving, mechanism comprising a wheel and a driving member, wherein the wheel is partially accommodated in the groove, and the driving member is connected to the wheel and configured to driving the wheel to rotate relative to the frame;
      a control assembly comprising a posture sensor and a controller, wherein the posture sensor is configured to detect a tilt angle of the frame with respect to a vertical direction, and the controller is electrically coupled to the driving member and configured to control a rotation speed of the driving member according to a detection result of the posture sensor; and
      a power supply device electrically coupled to the control assembly, wherein at least one of the power supply device and the controller is accommodated in the cavity,
   wherein the vehicle body further comprises two fixing assemblies, the moving mechanism comprises a central shaft, both ends of the central shaft are fixed to the frame via the two fixing assemblies, respectively; and
   wherein an end surface of the central shaft is D-shaped, the central shaft is provided with a mounting groove, and a bottom surface of the mounting groove abuts against the frame due to the fixing assembly.

2. The self-balancing vehicle of claim 1, wherein the driving member is integrated into a hub of the wheel, the driving member is a three-phase winding brushless motor comprising a central shaft, a stator, a rotor, and a Hall sensor; the central shaft, the stator and the rotor are coaxially arranged, the wheel is fixed to the rotor, the rotor is capable of driving the wheel to rotate relative to the stator, the Hall sensor is coupled to the central shaft and is configured to sense a position of the rotor when a rotation direction of the rotor changes, and the controller is configured to drive the rotor to rotate continuously according to a detection result of the Hall sensor; the stator comprises a stator core and a stator winding disposed on the stator core;
   the driving member further comprises a temperature sensor configured to detect a temperature of the stator winding; and
   the control assembly further comprises a power transistor mounted on the controller and in contact with the frame, the power transistor configured to drive three phase lines of the driving member.

3. The self-balancing vehicle of claim 1, wherein an orthographic projection of a geometric center of the foot platform on the ground coincides with an orthographic projection of a geometric center of the wheel on the ground.

4. The self-balancing vehicle of claim 1, wherein the control assembly further comprises a communication module, and the two vehicle bodies are wirelessly communicated via the communication module.

5. The self-balancing vehicle of claim 1, wherein the control assembly further comprises a pedal sensor disposed on the foot platform, the pedal sensor is a membrane switch.

6. The self-balancing vehicle of claim 1, wherein the power supply device is detachably connected to the frame.

7. The self-balancing vehicle of claim 1, wherein the control assembly further comprises a power switch, a charging port, a buzzer and a status indicator, the power switch is positioned on the frame and electrically coupled to the controller; the charging port is disposed on the frame and electrically coupled to the power supply device; the buzzer is electrically coupled to the controller and is capable of making an audible indication; and the status indicator is disposed on the frame and is configured to indicate an operating status of the vehicle body.

8. The self-balancing vehicle according to claim 1, wherein a ratio between a contact width between the wheel and the ground and a diameter of the wheel is 1/2.

9. The self-balancing vehicle of claim 1, wherein the cavity has two chambers that communicate with each other, the two chambers are separated by a protrusion structure surrounding the groove, the two chambers are respectively located at opposite sides of an axis of the wheel, and the lowest point of inner walls of the two chambers is lower than the highest point of the wheel.

10. The self-balancing vehicle of claim 9, wherein the power supply device comprises two batteries electrically coupled to each other, the two batteries are received in the two chambers, respectively.

11. The self-balancing vehicle of claim 1, wherein the power supply device comprises two batteries electrically coupled to each other, the two batteries are received in the cavity and located at opposite sides of a protrusion structure surrounding the groove.

12. A self-balancing vehicle, comprising:
   two spaced apart vehicle bodies, each vehicle body comprising:
      a carrier assembly comprising a frame and a foot platform, wherein the foot platform is connected to the frame to cooperatively form a cavity, a side of the frame away from the foot platform defines a groove;
      a moving mechanism comprising a wheel and a driving, member, wherein the wheel is partially accommodated in the groove, and the driving member is connected to the wheel and configured to driving the wheel to rotate relative to the frame;
      a control assembly comprising a posture sensor and a controller, wherein the posture sensor is configured to detect a tilt angle of the frame with respect to a vertical direction, and the controller is electrically coupled to the driving member and configured to control a rotation speed of the driving member according to a detection result of the posture sensor;

a power supply device electrically coupled to the control assembly wherein at least one of the power supply device and the controller is accommodated in the cavity; and a connecting rod, wherein the two vehicle bodies are detachably rotatably coupled to both ends of the connecting rod, respectively.

13. A self-balancing vehicle, comprising:

two spaced apart vehicle bodies, each vehicle body comprising:
- a carrier assembly comprising a frame and a foot platform, wherein the foot platform is connected to the frame to cooperatively form a cavity, a side of the frame away from the foot platform defines a groove;
- a moving mechanism comprising a wheel and a driving member, wherein the wheel is partially accommodated in the groove, and the driving member is connected to the wheel and configured to driving the wheel to rotate relative to the frame;
- a control assembly a posture sensor and a controller, wherein the posture sensor is configured to detect a tilt angle of the frame with respect to a vertical direction, and the controller is electrically coupled to the driving member and configured to control a rotation speed of the driving member according to a detection result of the posture sensor; and
- a power supply device electrically coupled to the control assembly, wherein at least one of the power supply device and the controller is accommodated in the cavity;

wherein the vehicle body further comprises at least two auxiliary support mechanisms connected to the frame, the auxiliary support mechanism is configured to touch the ground when the frame tilts forward or backward.

* * * * *